Dec. 22, 1959

A. T. C. BURROWS 2,918,021

CONVEYOR SYSTEMS

Filed March 20, 1957

4 Sheets-Sheet 1

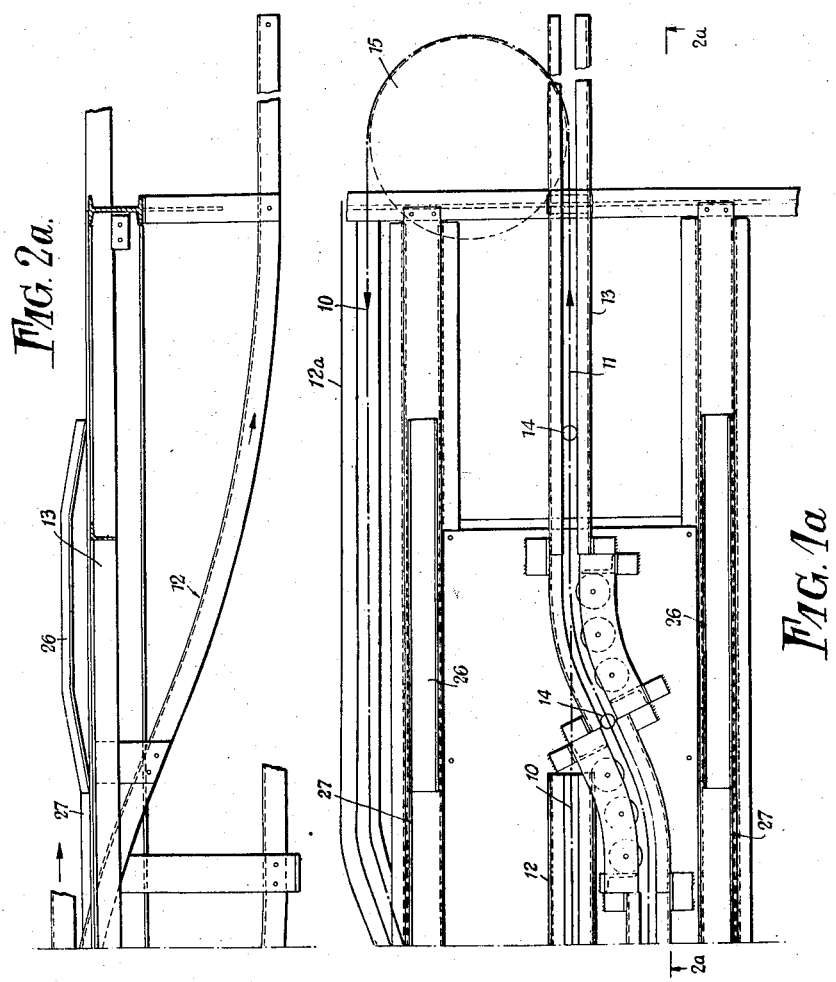

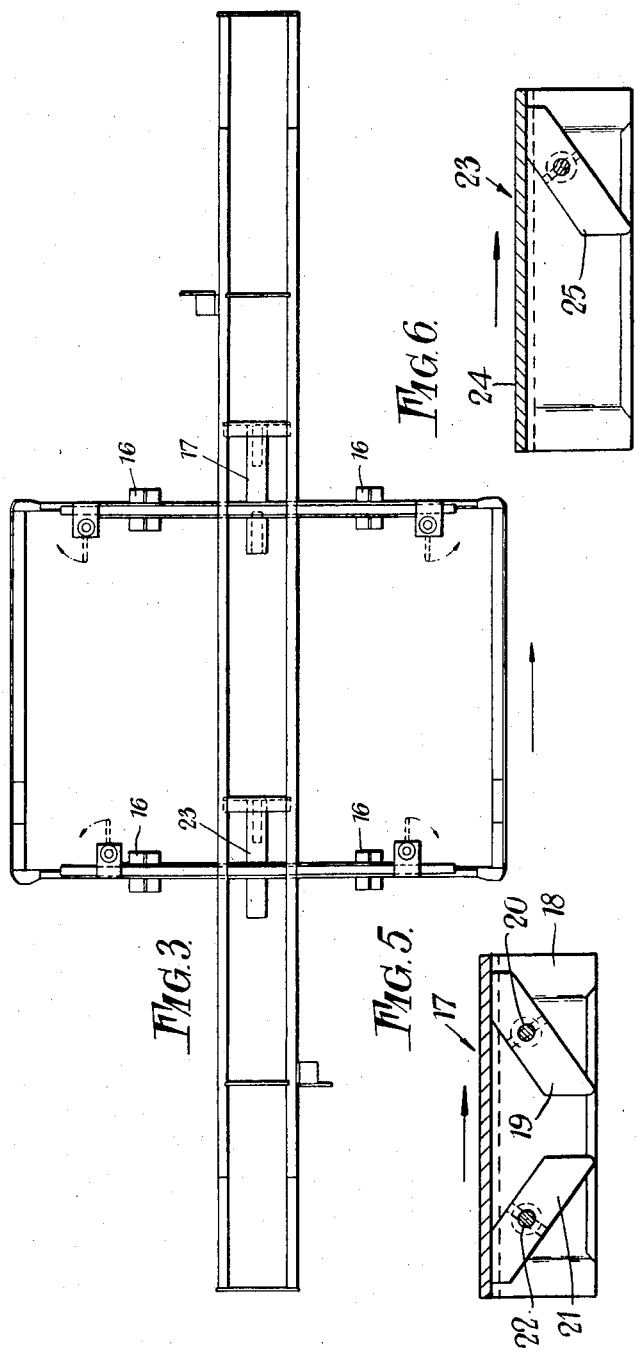

Dec. 22, 1959  A. T. C. BURROWS  2,918,021
CONVEYOR SYSTEMS
Filed March 20, 1957  4 Sheets-Sheet 4
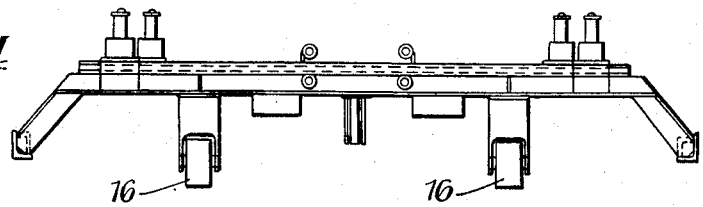
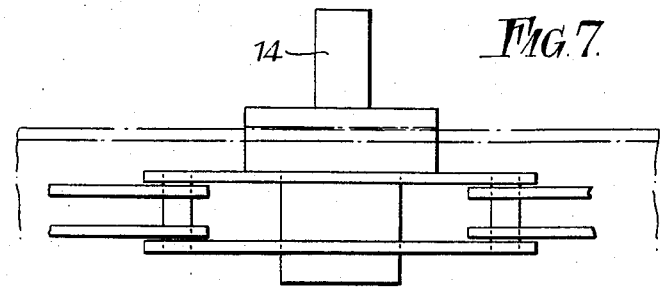
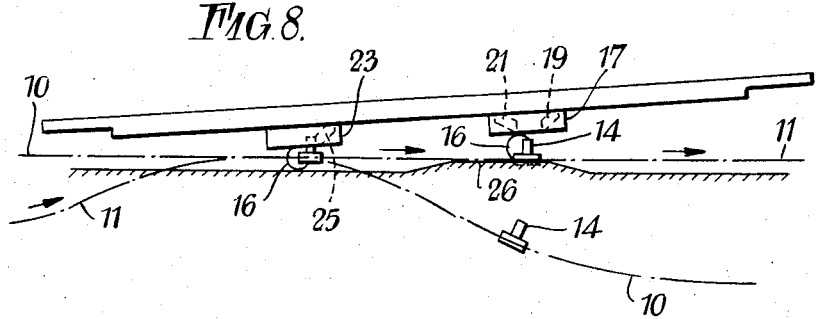

United States Patent Office 2,918,021
Patented Dec. 22, 1959

2,918,021

CONVEYOR SYSTEMS

Arthur Thomas Charles Burrows, Stevenage, England

Application March 20, 1957, Serial No. 647,387

Claims priority, application Great Britain March 22, 1956

5 Claims. (Cl. 104—172)

This invention relates to conveyor systems and more particularly to so-called floor conveyors of the kind wherein load carrying trolleys are propelled along a floor or other surface by means of an underlying endless driven chain which carries upwardly directed driving dogs or abutments which are adapted to engage means at the underside or lower part of each trolley.

It is the chief object of the present invention to evolve means whereby in an installation including two driven chains which generally follow different paths or routes it will be possible to cause a trolley to be transferred from driving engagement with one chain into driving engagement with the other at one or more selected points.

According to the present invention in a system of the kind referred to and incorporating two independent driving chains which generally follow different paths but which are disposed in proximity to each other in a preselected transfer zone the provision of means adapted as a trolley enters such zone to provide for a first relative vertical movement between the trolley and its driving chain to bring about discontinuance of the drive from such chain and a subsequent reverse relative vertical movement between said trolley and the second driving chain thereby to cause said trolley to be drivingly engaged by said second chain. Preferably the arrangement will be such that a drive will continue to be imparted to the trolley from the first chain until or substantially until a driving connection is established between said trolley and the second chain.

Figure 1:
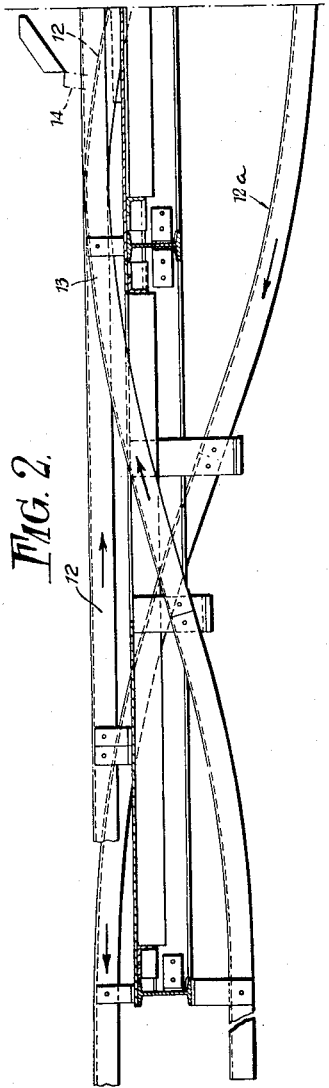
Figure 2:
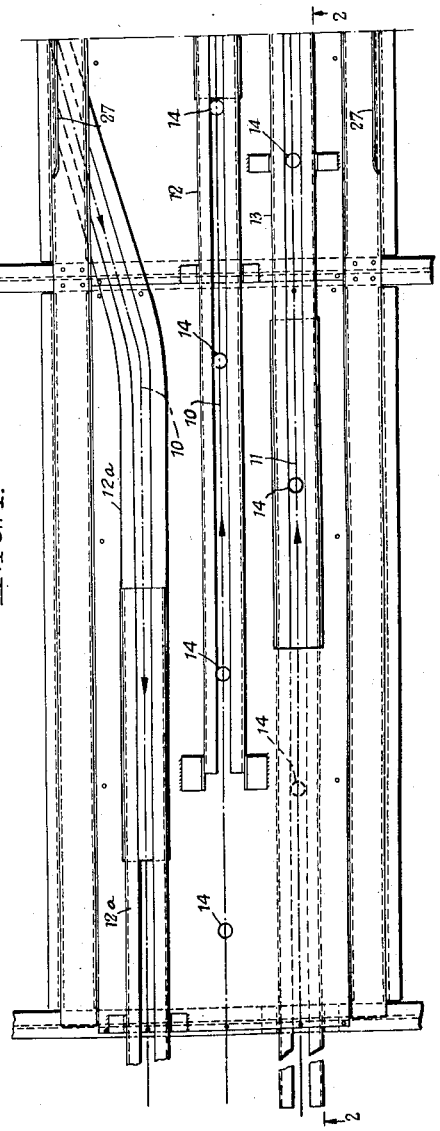

In order that the said invention may be clearly understood and readily carried into effect the same will be hereinafter more fully described with reference to the accompanying drawings in which:

Figures 1 and 1a together show a plan view of a part of a floor conveyor system whereat transfer of trolleys from one driving chain to another is effected, Figures 2 and 2a are sectional view taken on the lines 2—2 and 2a—2a respectively of Figure 1, Figure 3 shows a plan view of a load carrying trolley, Figure 4 is an end elevational view of the trolley shown in Figure 3, Figures 5 and 6 are part-sectional views of details of the trolley, Figure 7 illustrates, in side elevational view, a fragment of a suitable type of conveyor chain incorporating a driving dog or abutment, Figure 8 is a diagrammatic view which illustrates the way in which transfer from one chain to another is effected.

Referring to the drawings 10 and 11 denote two endless driven chains which are disposed respectively in channelled tracks 12 and 13 located in a floor or other surface so that the chains will travel below the level of the latter. The chains may be of any known type such for example as is illustrated in Figure 7 and at spaced points therealong they will be provided with pusher dogs or driving abutments 14 which are adapted to project upwardly above the level of the floor or other surface and to engage means located at the underside of load carrying trolleys which are supported on such floor or surface thereby to impart a drive to such trolleys.

The chains 10 and 11 will be so disposed as generally to follow different paths or routes but at one or more selected zones such as is indicated in Figures 1 and 1a wherein provision is to be made for transfer of trolleys from one chain to the other said chains are arranged to run in proximity to each other and in substantially parallel relation. It will be seen that at the actual transfer zone the chain 10 is led downwardly and thence around a sprocket 15 (Fig. 1a) whence it will be caused to travel back in the reverse direction in the track 12a while the chain 11 is led upwardly to the working level of the chain 10 and is caused to follow a path which is in fact a continuation of that previously followed by the chain 10. Chains 10 and 11 do not physically intersect and where they cross, one chain dips below the other so as to avoid contact.

In Figures 3 and 4 one type of load carrying trolley is indicated, such trolley being supported by means of four castor wheels 16 adapted to engage and run on the floor or other surface below which the chains are installed. The trolley is provided at its fore part and centrally of the underside thereof with a dog engaging device designated generally by 17 adapted to be engaged by any driving dog or abutment on one or other of the chains. As will be seen from Figure 5 such dog engaging device comprises an inverted U or channelled element 18 housing a tongue or the like 19 capable of pivotal movement in a clockwise direction about a horizontal axis 20. In addition to the tongue 19 a second tongue 21 is provided which is capable of pivotal movement about an axis 22, said two tongues when in their operative positions as shown together forming a recess capable of receiving the upper end of a driving dog or abutment 14 carried by one or other of the chains. By virtue of the pivotal mounting of the tongues 19 and 21 of the dog engaging device it will be possible on appropriate positioning of a trolley over one of the chains for a driving dog or abutment 14 to effect the necessary driving engagement with the trolley without possibility of jamming. Furthermore the device is such that the dog or abutment 14 once engaging will be positively held and undesired disengagement will not take place.

In addition to the dog engaging device 17 there is provided at the underside of each trolley and at or adjacent the rear part thereof having regard to the direction of travel a longitudinally extending guide element designated generally by 23 and comprising an inverted U or channelled element 24 having mounted at the forward end thereof a pivoted tongue 25 capable of pivotal movement from the position shown in a clockwise direction. The guide element is adapted to be engaged by one of the driving dogs 14 on the chain but the arrangement is such that such dog will not normally perform any driving function and will merely serve to guide the rear end of the trolley. By virtue of the engagement of a driving dog 14 with the guide element 23 the rear end of the trolley will be prevented from any undesired lateral swinging movement during travel along the conveyor path and the trolley will be positively maintained in alignment with the driving chain.

In the region of the transfer zone two ramp portions 26 are provided on the floor or other surface such portions being so arranged that as a trolley engaged and towed by the chain 10 reaches the transfer zone the supporting castors 16 at the front part of said trolley will engage and run on to the ramp portions 26. It will be appreciated that as the trolley approaches the transfer point and commences to ride up the ramp portions 26 the front end thereof will be raised thereby to lift the dog engaging device 17 clear of the driving dog or abutment 14 on the chain. This disengagement of the dog is facilitated by virtue of the lowering off of the chain 10. As the driving dog or abutment 14 on the chain is disengaged from the device 17 a drive will still be imparted to the trolley via the dog which then engages the tongue 25 of the guide element 23 at the rear part of the trolley. The relative disposition of the driving chains 10 and 11 at the transfer point is such that as the rear part of the trolley commences to travel up the ramp portions 26 and thus bring about disengagement of the dog from the guide element 23, the front part of the trolley will be descending over the chain 11 and a driving dog 14 on the latter will engage the dog engaging device 17 thereby again to impart a positive drive to the trolley. The transfer operation above described will be clarified by reference to the diagrammatic Figure 8 of the drawings. It will be appreciated that the drive chains 10 and 11 will require to be synchronised or substantially so, so that as the forepart of the trolley comes into position over the chain 11 at the transfer point a driving dog or abutment 14 on said second chain will be in or approaching a position such that it will engage the dog engaging device 17, the chain 10 having previously followed a path divergent in a vertical sense from the path of the trolley.

In order to guide the trolley and to prevent any undesired lateral movement during a transfer operation when either the device 17 or element 18 is disengaged from the chain stationary guides 27 are provided.

If desired the arrangement may be such that during transfer the drive to the trolley will actually be discontinued for a short space of time after the driving dog or abutment has been disengaged from the dog engaging device 17 at the forepart of the trolley. During such time the front castors 16 on the trolley would stand on the tops of the ramp portions 26 which will be substantially flat or horizontal. Possibly it might be desirable actually to locate the trolley in such position by providing shallow depressions on the tops of said ramp portions in which the front castors would be temporarily located although from a driving point of view only it would not matter if the trolley were to run back until its progress were halted by the engagement of the next following dog with the tongue 25 of the guide element 23.

With a layout of chains different from that above described and illustrated it may be feasible to arrange for the ramp portions 26 to be movable into and out of an operative position thereby to provide for selectivity of transfer.

I claim:

1. A floor conveyor comprising a wheeled trolley supported on the floor, a first driven chain at a substantially horizontal operative level below the floor, means at least in part on the first chain to establish a connection between said chain and said wheeled trolley, the chain, at a transfer point, descending from its operative level to a lower level, a second driven chain below floor level, means at least in part on the second chain to establish a connection between said second chain and the wheeled trolley, said second chain being, in the region of said transfer point, at a substantially horizontal level corresponding to the operative level of the first chain and following a path wherein it is aligned in part with and effectively forms a continuation of said first chain from a position adjacent that at which the latter descends, means to support said chains at said horizontal levels, and ramp means in the region of the transfer point to lift and subsequently lower the trolley relative to the operative level of the two chains thereby to disconnect said trolley from said first chain as the latter descends and subsequently establishing a towing connection with the second chain.

2. A conveyor as claimed in claim 1 wherein said means comprises driving dogs coupled to the chains and extending vertically thereof for engagement with the trolley.

3. A conveyor as claimed in claim 1 wherein said means comprises driving dogs on each chain and spaced depending devices on the trolley for the engagement of at least two dogs on each chain driving normal operation.

4. A conveyor as claimed in claim 3 wherein at least one depending device comprises at least one U-shaped member defining a channel opening downwardly and aligned with the direction of travel of the trolley, and levers pivoted in the channel and defining a space in which to accommodate a dog.

5. A floor conveyor comprising first and second driven chains including portions in mutually aligned relationship in a horizontal plane beneath the floor whereby the portions constitute extensions of one another, means supporting the portions in said plane, a wheeled trolley, driving members on the chains for engaging and driving the trolley, and a ramp on the floor above the chain portions and defining a transfer station, the ramp including oppositely sloped portions for raising the trolley at least in part from the floor and out of engagement with the driving member on one chain and lowering the trolley to the floor for engagement by the driving member on the other chain.

References Cited in the file of this patent

UNITED STATES PATENTS

| | | |
|---|---|---|
| 1,000,106 | Morris | Aug. 8, 1911 |
| 1,124,269 | Bernheim | Jan. 12, 1915 |
| 1,625,501 | Robertson | Apr. 19, 1927 |
| 1,775,545 | Anderson | Sept. 9, 1930 |
| 2,344,155 | McBride | Mar. 14, 1944 |
| 2,510,318 | Rose | June 6, 1950 |
| 2,527,244 | Culver | Oct. 24, 1950 |
| 2,635,555 | Hanson | Apr. 21, 1953 |
| 2,660,127 | Boyko et al. | Nov. 24, 1953 |

FOREIGN PATENTS

| | | |
|---|---|---|
| 627,599 | Great Britain | Aug. 11, 1949 |

UNITED STATES PATENT OFFICE
CERTIFICATE OF CORRECTION

Patent No. 2,918,021                 December 22, 1959

Arthur Thomas Charles Burrows

It is hereby certified that error appears in the above numbered patent requiring correction and that the said Letters Patent should read as corrected below.

In the grant, lines 1 to 3, for "Arthur Thomas Charles Burrows, of Stevenage, England," read -- Arthur Thomas Charles Burrows, of Stevenage, England, assignor to Geo. W. King Limited, of Stevenage, Hertfordshire, England, a British Company, -- line 12, for "Arthur Thomas Charles Burrows, his heirs" read Geo. W. King Limited, its successors --; in the heading to the printed specification, line 3, for "Arthur Thomas Charles Burrows, Stevenage, England, read -- Arthur Thomas Charles Burrows, Stevenage, England, assignor to Geo. W. King Limited, Stevenage, Hertfordshire, England, a British Company --.

Signed and sealed this 21st day of June 1960.

(SEAL)
Attest:

KARL H. AXLINE                                ROBERT C. WATSON
Attesting Officer                            Commissioner of Patents